United States Patent [19]

Lehureau et al.

[11] 3,913,076

[45] Oct. 14, 1975

[54] READING OUT AND TRACKING A RECORDED DIFFRACTIVE TRACE WITH AN ELONGATED READ OUT SPOT

[75] Inventors: Jean Claude Lehureau; Claude Bricot, both of Paris, France

[73] Assignee: Thomson-Brandt, Paris, France

[22] Filed: Feb. 27, 1974

[21] Appl. No.: 446,503

[30] Foreign Application Priority Data

Mar. 2, 1973 France ............................ 73.07542

[52] U.S. Cl................340/173 LT; 179/100.3 G; 179/100.3 V; 250/202

[51] Int. Cl.$^{2}$.................... G11C 13/04; G11B 17/00

[58] Field of Search... 340/173 LM, 173 R, 173 LT; 179/100.3 G, 100.3 V, 100.41 L, 100.3 M; 178/6.6 R, 6.6 DD; 250/202

[56] References Cited

UNITED STATES PATENTS

| | | | |
|---|---|---|---|
| 1,792,752 | 2/1931 | Michelssen | 179/100.3 G |
| 3,732,363 | 5/1973 | Glenn | 179/100.3 G |
| 3,801,824 | 4/1974 | Eastwood et al. | 340/173 LM |

OTHER PUBLICATIONS

Bouwhuis et al., The Optical Scanning System of the Philips 'VLP' Record Player, Philips Tech., Rev. 33, 186–189, 1973, No. 7.

Herd, Computer Control of Half-Tone Printing, IBM Technical Disclosure Bulletin, Vol. 15, No. 4, 9/72, p. 1329.

*Primary Examiner*—Stuart N. Hecker
*Attorney, Agent, or Firm*—Cushman, Darby & Cushman

[57] ABSTRACT

The present invention relates to the optical read-out of a diffractive track carried by a record. The read-out system in accordance with the invention comprises means for projecting onto the surface of the record, a read-out spot of oblong form whose major axis intersects the longitudinal axis of the read-out track. Photodetector means receive separately the diffracted radiation components corresponding to the zero order and to higher orders.

9 Claims, 5 Drawing Figures

READING OUT AND TRACKING A RECORDED DIFFRACTIVE TRACE WITH AN ELONGATED READ OUT SPOT

The present invention relates to optical information read-out. It relates more particularly to the read-out of a physical substrate at the surface of which there has been recorded a track comprising a succession of diffractive elements which have a substantially constant width and whose non-uniform length and spacing constitute the transcription, along the track, of a rectangular waveform containing the information which is to be read-out.

In accordance with one known embodiment, the information substrate or, in other words, data carrier, takes the form of a disc whose smooth surface carries the impression of a spiral track. Along this track, the diffractive elements are materialised by depressions or projections of constant width not exceeding more than a few microns. To extract the optical information stored along the track, it is a known procedure to utilise a read-out head comprising a light source associated with a microscope lens, in order to project on to the surface of the disc, a circular light spot illuminating the width of the track.

The illuminated zone of the track, under the effect of the incident radiation, produces an emergent radiation which experiences substantial diffraction on passing through the diffractive elements. It is therefore possible to extract the optical information by arranging for said optically modulated radiation to be received on an assembly of photodetector elements spatially and electrically arranged in such a fashion as to simultaneously supply the rectangular waveform carrying the information, and a signal representing the eccentricity of the read-out spot vis-a-vis the track. If the circular read-out spot has a diameter equal to the width of the track, the rectangular waveform will have good definition but its amplitude will undergo spurious variations as soon as the read-out spot develops any eccentricity. In addition, since the feed-back control of the read-out head enables the projected spot to scan the track despite transverse displacements in relation to the direction of transfer, it is liable to develop operational instability as a consequence of an inadvertent change in the sign of the gain of the feed-back loop.

This instability can be partially remedied by arranging that the circular spot substantially overlaps the track, although the definition of the rectangular waveform is then substantially reduced. In addition to these drawbacks it has to be pointed out that the use of a coherent light source in order to obtain a spot which is sufficiently fine, risks the production in the known kinds of read-out devices, of parasitic signals which arise from interference between the various diffraction orders projected onto the photodetector elements.

In order to overcome these drawbacks, the invention proposes a read-out device which is equipped with an optical projection system capable of forming in the read-out plane of the support or data carrier, an elongated spot which overlaps said track and whose major axis intersects the longitudinal axis of the track.

The utilisation of a spot of oblong shape makes it possible to obtain a high-definition read-out signal whose amplitude is substantially constant for a track eccentricity which is limited to half the major axis length of the read-out spot; if the eccentricity exceeds this limit, the position control device comes into operation and stably recentres the read-out head.

In accordance with the present invention, there is provided an optical system for reading-out a diffractive track of predetermined width forming at the surface of a record an embossed pattern constituted by successive diffracting elements, said optical system comprising: a source of radiant energy, illuminating means associated with said source for projecting onto said surface an elongated read-out spot, and photo-electric means arranged for receiving selected portions of the radiant energy emerging from the illuminated portion of said surface; said elongated read-out spot having a major axis at an angle with the longidudinal axis of said track for exploring said surface along a strip having a width greater than said predetermined width; said photoelectric means comprising a main photodetector, further photodetectors and electrical transmission means coupled to said photodetectors; said main photodetector receiving at least one portion of the zero order diffracted component contained in the radiation emerging from the illuminated portion of said surface; said further transducers being arranged outside the beam containing said zero order diffracted component for picking-up diffracted components of higher orders.

For a better understanding of the present invention and to show how the same may be carried into effect, reference will be made to the following description and the attached figures among which:

Figure 1:
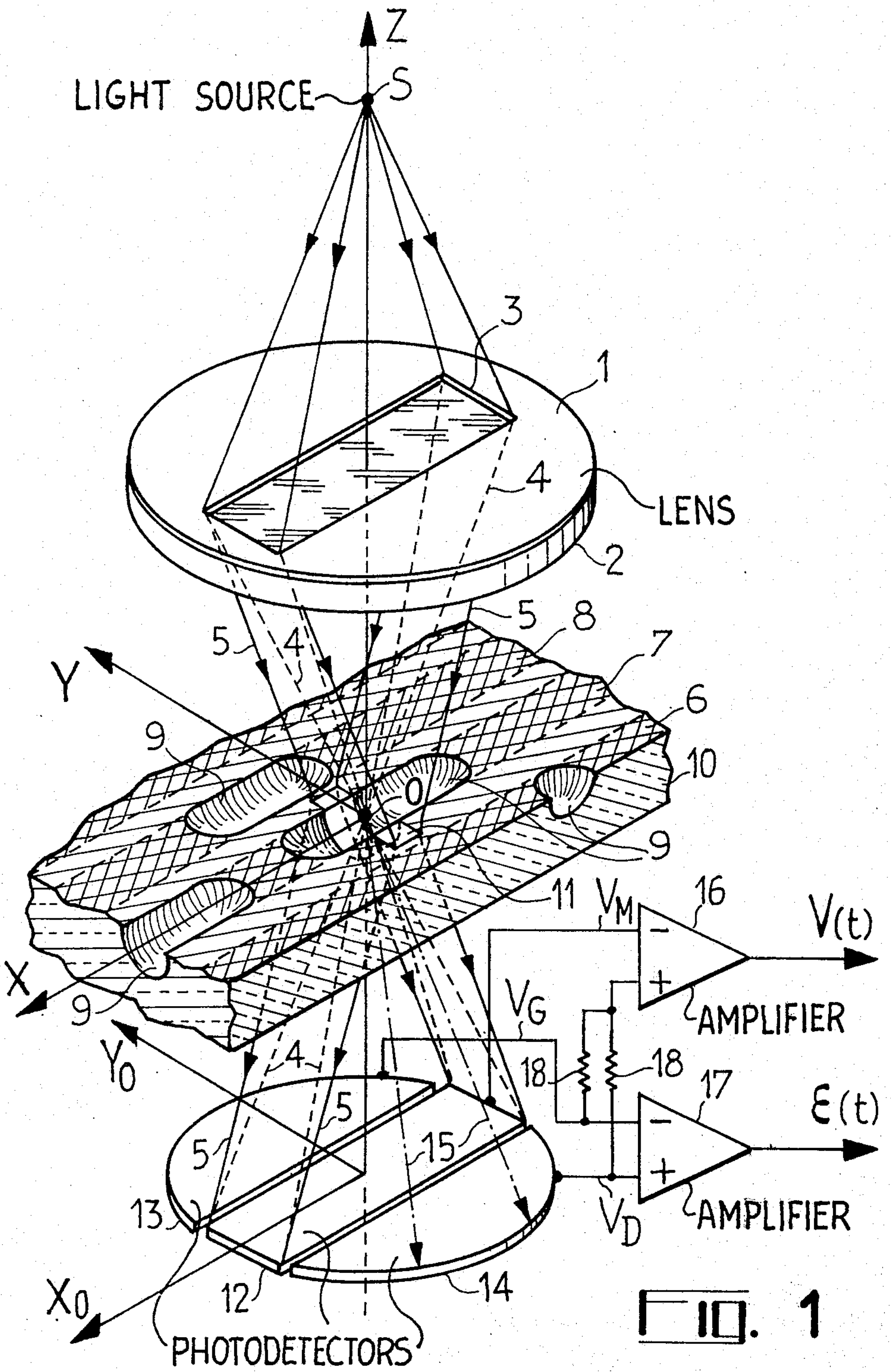
FIG. 1 illustrates a first example of a read-out system in accordance with the invention.

In FIG. 1, a fragment of a record 10, or data carrier, has been shown, the top face of which, located in a read-out plane XOY, carries the impression of a diffractive track. By way of non-limitative example, it has been assumed that this track is recorded in spiral fashion at the surface of the substrate 10, the latter taking the form of a disc. The centre of the disc is located in extension of the axis OY which represents the radial direction, whilst the axis OX represents the direction of transfer. The track thus, in FIG. 1, takes the form of equidistant sections of turns 6, 7 and 8, whose pitch is greater than the width of the track which latter is equal to the width of the recesses 9 which, in the case of the figure, constitute the diffractive elements of the track. It should be understood, of course, that the invention is certainly not limited to the reading out of a track of hollow form because diffractive elements of projecting kind would produce an entirely similar diffracting action upon the read-out radiation employed. The invention, furthermore, is not limited to the use of a disc carrying a spiral track, and could indeed be applied without any modification to the case of a tape carrying one or more tracks arranged in accordance with the longitudinal axis OX.

The read-out system proper, is made up of a substantially point source S located for example upon the optical axis OZ of an optical projection system itself constituted by an objective lens 2 capable of forming at O the image of the source S, and of an optical filter 1 covering the pupil of the objective lens 2. In FIG. 1, the optical filter 1 is an opaque mask provided with a window of rectangular outline 3 which serves to delimit the beam of radiant energy transmitted towards the read-out plane XOY where the surface of the record 10 is located. Assuming that the source S is a point source, and disregarding for the moment phenomena of diffraction, the path of the light rays can be represented by the family of straight broken lines 4 emerging from the pupil 3. This optical construction, which is purely geometric in nature, shows that the radiation issuing from the pupil 3 gives rise, in a detection plane $X_o$ $Y_o$, to a zero order illumination component which is confined to the rectangular base of a pyramid whose apex is the point O of geometric convergence and whose edges are defined by the straight broken lines 4.

To simplify matters, we will disregard the refraction phenomenon associated with the transiting of the transparent record 10. Accordingly, the basis of the pyramid can be considered as a pseudo image of the pupil 3 since it will effectively be produced if, assuming projection radiation of infinitely short wavelength, it is transmitted via an opaque mask pierced by a pin hole located at the point O.

If we now introduce the phenomena of diffraction, then, as those skilled in the art will appreciate, the radiation issuing from the pupil 3 will not converge in point fashion at O but will instead be spread around said point. The rays emerging from the pupil 3 are located inside an envelope 5 indicated in full line. The narrowest section of this envelope 5 is an oblong zone 11 which constitutes the effective read-out spot. At the level $X_oY_o$ and as long as no other diffractive element 9 is located in the trajectory of the read-out beam 5, the diffraction produces a negligible marginal disturbance in the zero order illumination hereinbefore referred to.

In accordance with the invention, a main photodetector 12 is arranged in order to selectively pick up a fraction of the zero order illumination, that is to say the active surface of said transducer is located inside the pseudo image formed in the plane $X_oY_o$ by the conical projection of centre O, of the pupil 3. Thus, the photodetector 12 is dependent exclusively upon the zero order illumination and the same applies to the output voltage $V_M$. In addition to the main photodetector 12, the invention provides for the arrangement, in the manner shown in FIG. 1, of lateral photodetectors 13 and 14 disposed side-by-side with the photodetector 12, along the long sides of the rectangular perimeter of the zero order illumination zone. When to diffractive element 9 is being illuminated by the oblong spot 11, the lateral photodetectors 13 and 14 receive virtually no radiation and the voltages $V_G$ and $V_D$ respectively produced, are substantially zero. The result is that the mean voltage available at the common point of the two identical resistors 18, is likewise close to zero. The differential amplifier 16 which is supplied at one of its inputs with the mean voltage $$\frac{V_G + V_D}{2}$$

and at its other input with the voltage $V_M$, produces a voltage $V(t)$ proportional to the difference between these input voltages. Accordingly, in the absence of any diffractive element 9 in the trajectory of the read-out radiation 5, the voltage $V(t)$ has a value proportional to $V_M$. The differential amplifier 17 which is supplied at its inputs with the voltages $V_G$ and $V_D$, supplies an error voltage $\epsilon(t)$ proportional to the difference between the input voltages. The error voltage $\epsilon(t)$ is close to zero in the absence of any diffractive element (9) in the path of the read-out beam 5, and moreover, it is independent of the zero order radiation.

Making the assumption, as in FIG. 1, that a diffractive element 9 of the track portion 7, has moved into position opposite the read-out spot 11, the radiation emerging from the illuminated zone of the record 10, will be radically diffracted at its level. The zero order component undergoes a dip in intensity to the benefit of the higher order diffracted components which diverge sufficiently to illuminate the lateral photodetectors 13 and 14 with the diffracted rays 15. The voltages $V_G$ and $V_D$ increase in amplitude and the voltage $V_M$ correspondingly drops. The overall effect is a reduction in the voltage $V(t)$. As far as the voltage $\epsilon(t)$ is concerned, it retains a low value as long as the spot 11 completely covers the diffractive element, but acquires a substantial positive or negative value as soon as the spot 11 has moved off-centre in the Y direction, sufficiently for the diffractive element 9 to be no longer more than partially illuminated by the read-out beam 5.

Figure 2:
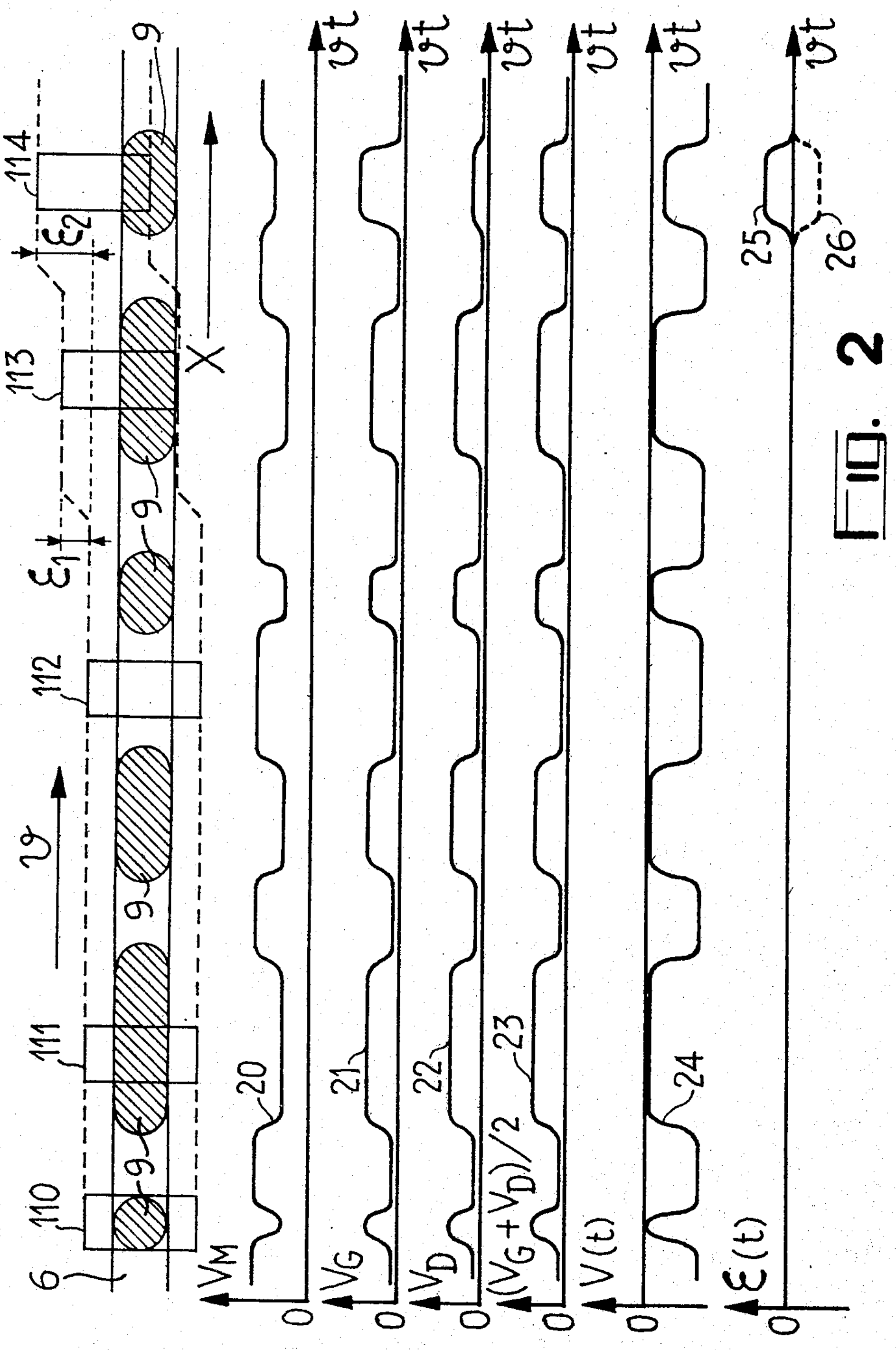
FIGS. 2 and 3 are explanatory diagrams.

To make the situation clearer, in the explanatory diagram of FIG. 2, the operation of the read-out system in accordance with the invention, has been illustrated.

The top part of the diagram shown in FIG. 2 this representing a plan view of the surface of the record 10, shows a track portion 6 made up of a succession of diffractive elements 9 which have been cross-hatched. During read-out of the track section 6, the read-out spot 11 displaces relatively to the track at a transfer speed v, this successively causing it to occupy the positions signified by the rectangles 110, 111, 112, 113 and 114. The first three positions 110, 111, and 112, correspond to a read-out spot centred in relation to the track; the fourth position 113 corresponds to a moderate eccentricity $\epsilon_1$, and the fifth position 114 to a greater eccentricity $\epsilon_2$. It will be seen that the read-out spot scans a range comprised between two envelope lines marked in broken line fashion, the interval between which is greater than the width of the diffractive track 6.

The diagrams located below the track, represent, as a function of the displacement $x = vt$ of the read-out spot 11, the variations occurring in the voltages $V_M$, $V_G$, $V_D$, ½ $(V_G + V_D)$, $V(t)$ and $\epsilon(t)$.

The diagram plotting the variation 20 in the voltage $V_M$ supplied by the main photodetector 12, shows that the intensity of the zero order radiation picked up, experiences a reduction in level with each transit of a diffractive element 9, and this experiences no change in the face of a read-out spot eccentricity limited to $\epsilon_1$ as indicated by position 113.

At position 114 on the part of the read-out spot, it will be seen that the reduction in level is not so marked because it now only partially covers the diffractive element 9 due to the eccentricity $\epsilon_2$ being greater than that $\epsilon_1$.

The diagrams which reproduce the variations 21, 22 and 23 in the voltages $V_G$, $V_D$ and ½ $(V_G = V_D)$ show up a reverse effect, that is to say with the passage of a diffractive element there is a rise in level. This rise in level is constant and equally distributed up to the position 113, but becomes inequally distributed when the read-out spot reaches position 114, due to the eccentricity $\epsilon_2$. This inequality in distribution is partially compensated if we consider the mean $\frac{1}{2}(V_G + V_D)$ of the voltages produced by the lateral photodetectors 13 and 14.

The diagram plotting the variation 24 in the output voltage $V(t)$ of the read-out system, is a rectangular waveform the rise and descent flanks in which are relatively steep due to the small width of the read-out spot in the direction of transfer. Because the read-out spot has an oblong shape, it will be seen that an eccentricity in excess of $\epsilon_1$ is required in order to bring about a reduction in the level of the signal $V(t)$.

Consequently, the read-out signal $V(t)$ can have good definition and, moreover, its amplitude does not fluctuate under the influence of eccentricities below the value $\epsilon_1$.

The error signal $\epsilon(t)$ is of course zero for the three first centred positions 110, 111 and 112, of the read-out spot, and it is still zero for the positions 113 which corresponds to the eccentricity $\epsilon_1$. The error signal $\epsilon(t)$ is produced for an eccentricity $\epsilon_2$ in excess of $\epsilon_1$, and its sign 25 or 26 is associated with the direction of the eccentricity.

The operation of the system shown in FIG. 1 has been described on the assumption that the surface of the record 10 is transferred in such a way that it remains in the plane XY throughout. However, it is essential that the read-out system should be able to operate correctly if the diffractive track is transferred slightly higher or lower than the point O. In particular, it is essential that the read-out signal $V(t)$ should retain good definition in the event of variations in the distance of the substrate 10 from the objective lens projecting the read-out spot. It is also essential that the error signal $\epsilon(t)$ should retain the same sign for a given eccentricity, when the surface of the substrate 10 displaces vertically from the ideal read-out position.

The read-out system in accordance with the invention makes it possible to satisfy these conditions, taking into account the nature of the illuminations received by the photodetectors. The explanation which now follows is based upon the experimental observation that the zero order illumination received by the photodetector 12, incorporates pseudo images of the diffractive elements if the surface of the record 10 is located higher or lower than the centre O of the finest read-out spot.

Figure 3:
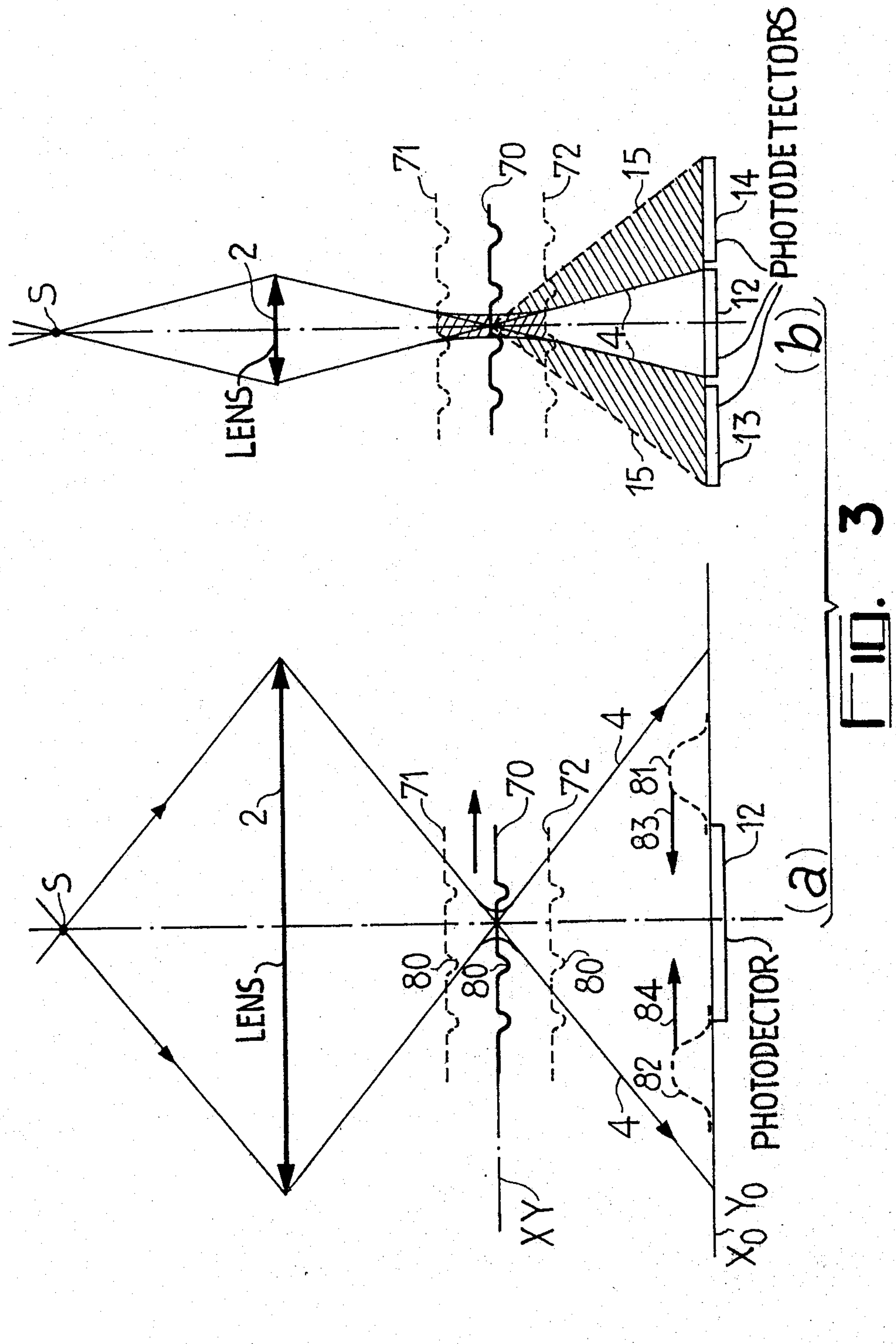

In FIG. 3, the read-out system of FIG. 1 has been schematically illustrated, at (*a*) in the plane of section XOZ and at (*b*) in the plane of section YOZ. Surface 70 of the record 10 has been shown in the ideal read-out position in full line, this coinciding with the line of the read-out plane XY. Also, in broken line, a position 71 on the part of the surface 70 has been shown, in which it has moved towards the objective lens 2, and likewise a position 72 in which it has moved away therefrom. The direction of transfer of the surface 70 of the substrate is indicated by the horizontal arrow and the diffractive element 80 is on the point of entering the read-out beam 4., that is unless it has already done so as a consequence of the substrate being too high or too low. Under ideal read-out conditions, the zero order radiation contained in the beam 4 will produce uniform illumination of the detection plane $X_oY_o$ and no disturbance will be observed when the diffractive element 80 encounters the read-out spot.

By contrast, if the surface 70 occupies the position 71, the zero order illumination received by the detection plane $X_oY_o$ will have a local disturbance 81 which can be likened to a pseudo image of the diffractive element 80; the latter displaces in the direction of the arrow 83, within the scope of the read-out beam 4. The same phenomenon is observed if the surface 70 occupies the position 72, but in that case the pseudo image of the diffractive element 80 this time occupies the position 82 and displaces in the direction of the arrow 84.

The existence of these disturbances has been experimentally observed in the case of the zero order but not in the direction corresponding to the higher diffraction orders. Since these are of such a nature as to randomly influence the error voltage $\epsilon(t)$ required for the tracking of the read-out system, the invention includes arrangements for isolating the photodetectors 13 and 14 from the zero order illumination, by reducing the apertural angle of the beam 4; thus, these photodetectors, within the cross-hatched zones 15 at (*b*) only receive the higher order diffracted rays. Only the main photodetector 12 experiences the zero order illumination and the disturbance which the latter may exhibit in the presence of a vertical displacement on the part of the surface 70. Since the pseudo images 82 and 83 have an extent which is smaller than that of the beam 4, it is possible to substantially improve the definition of the read-out signal by reducing the range covered by the photodetector 12, in the manner indicated at (*a*) in FIG. 3.

It should be pointed out that the decoupling between the zero order and the higher diffraction orders as illustrated at (*b*) in FIG. 3, could only have been achieved if the pupil of the objective lens 2 had had a circular shape of large diameter.

The read-out system in accordance with the invention makes it possible to use a read-out spot of oblong form to read a diffractive track whose longitudinal axis is disposed perpendicularly to the major axis of the spot. In this case, the read-out spot cannot extend beyond the pitch separating two neighbouring track sections. However, it is not essential that the major axis of the read-out spot should be perpendicular to the longitudinal axis of the track; it is sufficient to arrange that these axes intersect each other although the read-out signal has better definition if the intersection angle is in the neighbourhood of 90°.

To produce a read-out spot 11 of oblong form, in FIG. 1, the invention provides for a rectangular pupil to be defined, by arranging opposite the projection objective lens 2, a mask 1, the rectangular opening in which has its minor axis parallel to the major axis of the read-out spot. This latter angular relationship is the consequence of the diffraction properties of an aperture. If the aperture 3 is rectangular, the distribution of the complex light amplitudes in the pupil of the objective lens 2 is expressed by a product of rectangular functions, and this has a counterpart, in the plane XY where the read-out radiation is concentrated, in the form of an illumination which can be expressed by a two-variable Fourier transform of said distribution, that is to say an illumination proportional to $$\frac{\sin \pi \; a X/ \; \lambda d}{\dfrac{\pi a X}{\lambda d}} \cdot \frac{\sin \pi b \; Y/\lambda \; d}{\dfrac{\pi b Y}{\lambda d}}$$

where λ is the wavelength of the read-out radiation, $d$ the distance separating the plane XY from the objective lens 2, and $a$ and $b$ are dimensions of the rectangular pupil.

Under these conditions, in the read-out plane XY, a diffraction figure is obtained, the body of which is essentially constituted by the rectangular read-out spot. Self-evidently, without departing from the scope of the invention, it is possible to associate with the objective lens 2, an optical screen of non-uniform transparency which can produce apodization of the diffraction pattern. The technique of apodization provides diffraction patterns wherein the principal maximum is surrounded by subsidiary maxima whose amplitudes are made substantially equal to zero.

The read-out system in accordance with the invention can likewise be adapted to read-out of a diffractive track, by reflection.

Figure 4:
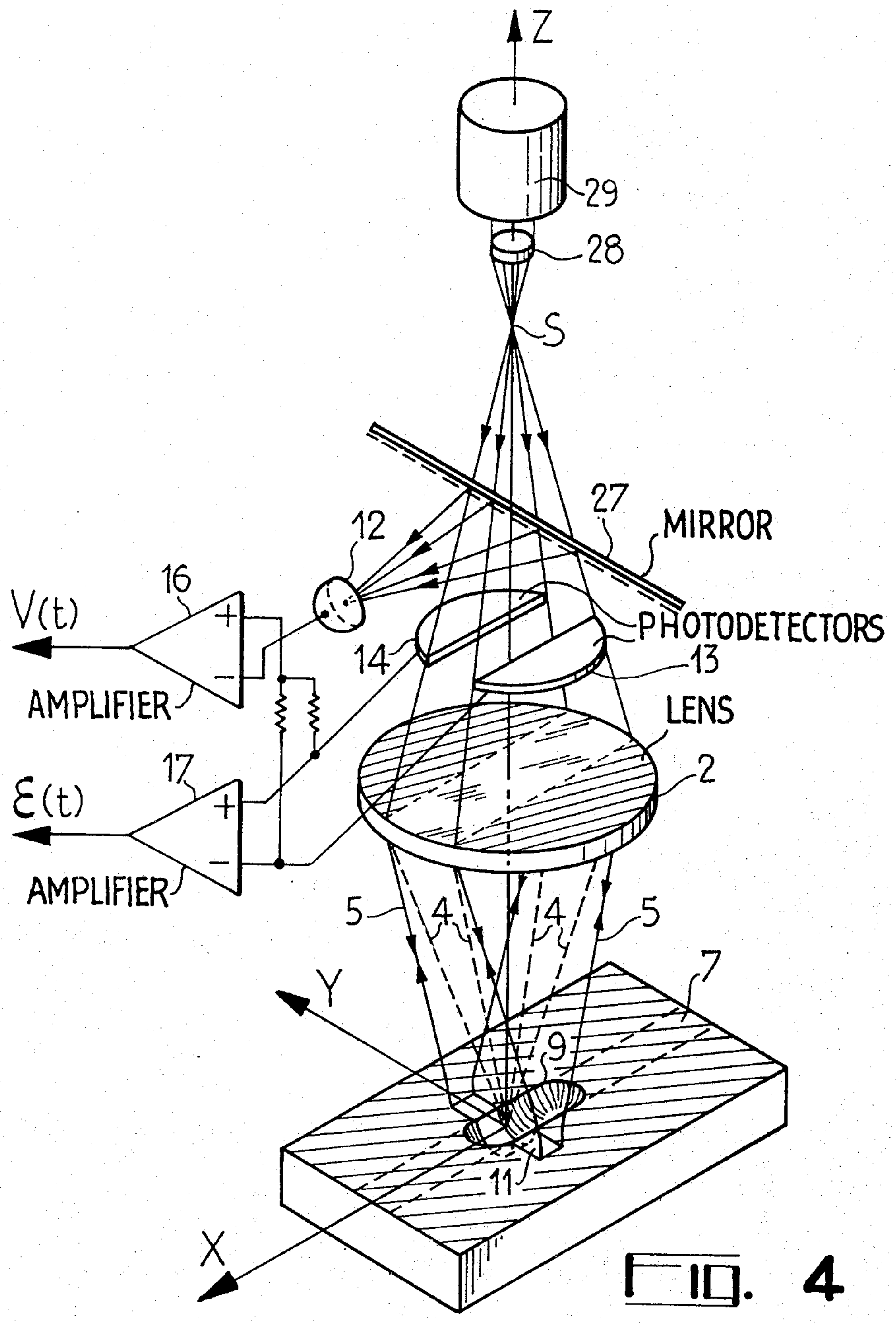
FIG. 4 illustrates a second embodiment of a read-out system in accordance with the invention.

In FIG. 4, a section of diffractive track 7 can be seen, located in the read-out plane 7 and illuminated by a read-out spot 11 of oblong shape which is projected by that area of the objective lens 2 which is not cross-hatched. The objective lens 2 receives a fraction of the radiation coming from the point focus S where a spherical convergent lens 28 causes the radiated energy emitted by a source 29 to converge. Photodetectors 13 and 14 whose sensitive faces are disposed towards the objective lens 2, are arranged to intercept part of the radiation coming from the focus S and transmitted by the semi transparent plate 27; the shape and the positions occupied by the photodetectors 13 and 14, are chosen in such a fashion that the shadows cast on the entry face of the objective lens 2, delimit a rectangular illuminated area located between the two cross-hatched zones. The orientation of the illuminated area is in the direction of transfer of the tracks so that the read-out spot which is projected from said area, perpendicularly intersects the track.

A main photodetector 12 is arranged so that its image as reflected by the plate 27, is formed in superimposition on the focus 7. The electrical connections of three photodetectors are established in the manner shown in FIG. 1, through the intermediary of electrical transmission means including differential amplifiers 16 and 17.

That surface of the record which carries the track 7, is a reflective surface which, in the absence of a diffractive element 9 in the path of the read-out beam 5, reflects towards the objective lens 2 a zero order radiation 4 which passes through it without encountering the photodetectors 13 and 14; this reflected zero order radiation, which tends to converge towards the focus S, is directed by the plate 27 towards the photodetector 12.

When a diffractive element 9 appears beneath the read-out beam 5, the reflected zero order radiation diminishes in intensity. Diffracted radiation components of higher orders, arise around the beam 4 and are directed by the cross-hatched zones of the objective lens 2, towards the sensitive faces of the lateral photodetectors 13 and 14. Thus, the radiations picked up by the three photodetectors are essentially of the same nature as those which are picked up in the system shown in FIG. 1. Since the photodetector 12 is a point transducer, the angular range of reception of the zero order beam can be restricted by only metallising a central strip of the semi-reflective plate 27.

In the read-out devices shown in FIGS. 1 and 4, recourse is had to a substantially point radiation source S. A fraction of the radiated energy is sacrificed by reason of the use of a mask containing an oblong shape opening, to delimit the read-out beam. In order to avoid this waste of radiated energy, the invention provides for the association with the spherical optical system of the projection objective lens, of anamorphotic optical transmission means constituted by an optical cylindrical combination capable of uni-directionally modifying the section of the beam issuing from the radiation source, so that it acquires the oblong shape required for read-out.

Figure 5:
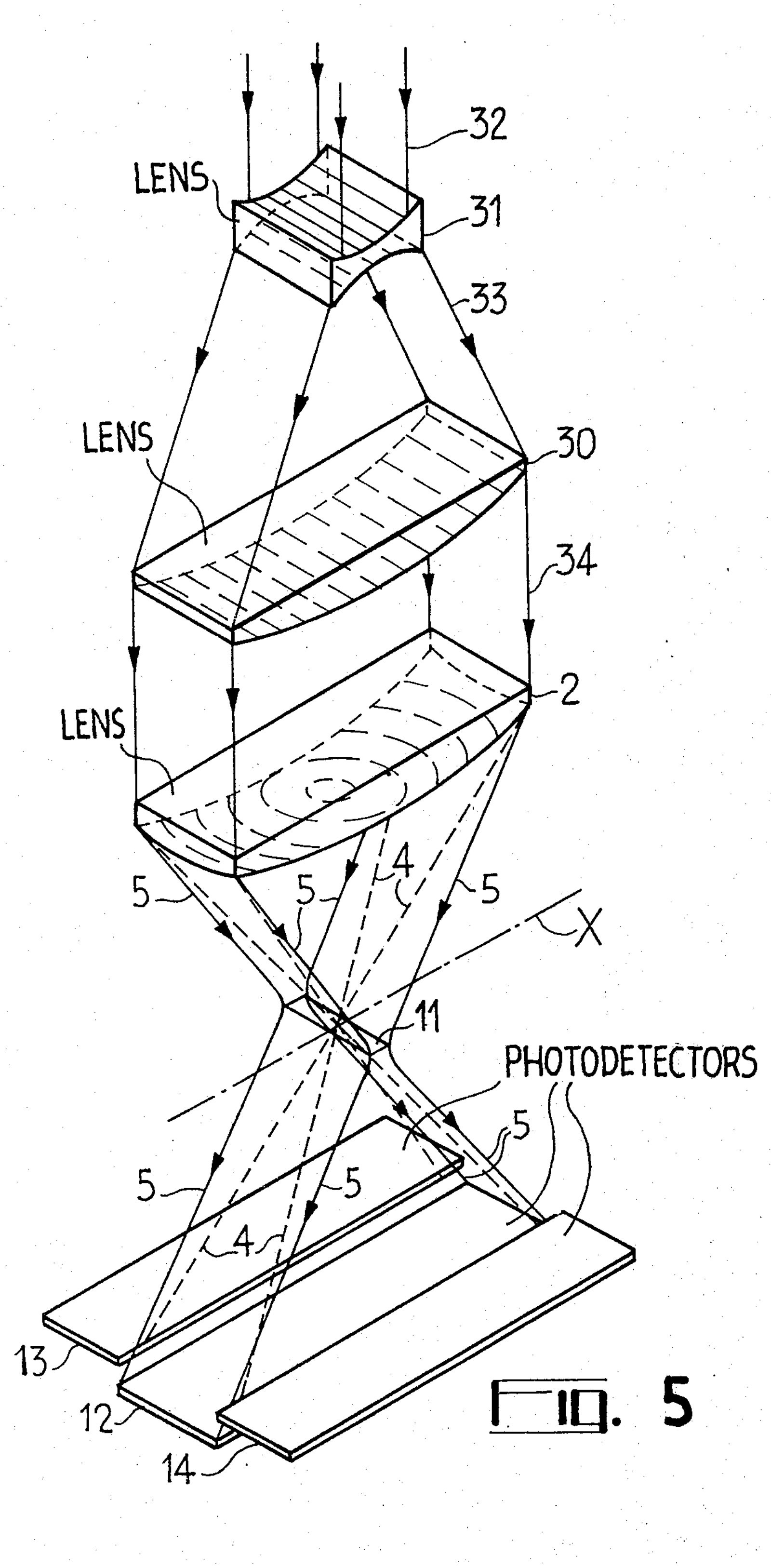
FIG. 5 illustrates a third embodiment of a read-out system in accordance with the invention.

In FIG. 5, there can be seen a variant embodiment of the read-out system in accordance with the invention, in respect of which it has been assumed that a radiation source (not shown), is producing a parallel beam 32 having a section whose dimension is equal to the smallest dimension of the elongated pupil of the projection objective lens 2. By way of non-limitative example, the beam 32 could be furnished by a laser, possibly followed by an afocal optical device to widen the beam. The adaptation of the beam 32 to the rectangular section of the pupil of the projection objective lens 2, is achieved by means of an anamorphotic optical device made up in FIG. 5, of a divergent cylindrical lens 31 and a convergent cylindrical lens 30. In the example shown in FIG. 5, the lenses 31 and 30 have a common focal line which can be localised by projecting the rays 33 towards the radiation source. The incident radiation on the projection objective lens 2, the latter being a spherical lens, is then a parallel radiation and the focus of said lens is located at the intersection between the rays 4 on the transfer axis X which is in the read-out plane.

FIG. 5 also shows how the transducers 12, 13 and 14 are not necessarily located in the same plane. Without departing from the scope of the invention, the lenses 31 and 30 can be substituted by some other anamorphotic optical device, for example by one or several prisms having their triangular faces perpendicular to one of the axis of symmetry of the elongated pupil of the objective lens 2. In the case where a coherent read-out light source is used, the assembly of cut lenses of the optical projection system can be replaced by a holographic lens having identical optical properties to the optical systems illustrated in FIGS. 1, 4 or 5. Self-evidently, Fresnel lenses could equally be used in the optical projection system in accordance with the invention.

What we claim is:

1. Optical system for reading-out a diffractive track of predetermined width forming at the surface of a record an embossed pattern constituted by successive diffracting elements, said optical system comprising: a source of radiant energy, illuminating means associated with said source for projecting onto said surface an elongated read-out spot, and photo-electric means arranged for receiving selected portions of the radiant energy emerging from the illuminated portion of said surface; said elongated read-out spot having a major axis at an angle with the longitudinal axis of said track for exploring said surface along a strip having a width greater than said predetermined width; said photoelectric means comprising a main photodetector, further photodetectors and electrical transmission means coupled to said photodetectors; said main photodetector receiving at least one portion of the zero order diffracted component contained in the radiation emerging from the illuminated portion of said surface; said further photodetectors being arranged outside the beam containing said zero order diffracted component for picking-up diffracted components of higher orders.

2. Optical read-out system as claimed in claim 1, wherein said illuminating means comprise a projection objective lens associated with optical filter means of non-uniform transparency effecting apodization of the diffraction pattern projected onto said surface; the body of said projected diffraction pattern corresponding substantially to said read-out spot.

3. Optical read-out system as claimed in claim 1, wherein said illuminating means comprise at least one holographic lens; said source being a coherent radiation source.

4. Optical read-out system as claimed in claim 1, wherein said further photodetectors comprise two lateral photodetectors located respectively to either side of the plane containing said longitudinal axis and the optical axis of said illuminating means; said electrical transmission means comprising a first differential amplifier having two inputs respectively supplied by said lateral photodetectors, and a second differential amplifier having two inputs respectively supplied from said main photodetector and with the mean value of the voltages produced by said lateral photodetectors.

5. Optical read-out system as claimed in claim 4, wherein said illuminating means comprise a projection objective lens causing the radiation issuing from said source to converge at a geometric point located, considering the ideal read-out position, in said surface; said lateral photodetectors being arranged apart from one another between said source and the entry face of said projection objective lens for delimiting a pupil of elongated from; said main photodetector receiving through the medium of a semi-transparent plate arranged between said lateral photodetectors and said source, a fraction of the zero order diffracted component reflected by said read-out surface.

6. Optical read-out system as claimed in claim 1, wherein said illuminating means comprise a projection objective lens associated with an opaque mask containing an elongated aperture; the geometric centre of convergence of the radiation issuing from said objective lens, in the ideal read-out position, being located in said surface and at the centre of said read-out elongated spot; said main contour in relation to said geometric centre of the perimeter of said aperture; said further photodetectors being located outside said contour.

7. Optical read-out system as claimed in claim 6, wherein said aperture is a rectangular aperture having a major axis; said major axis forming with the optical longitudinal axis of said track.

8. Optical read-out system as claimed in claim 6, wherein anamorphotic optical transmission means are arranged between said source and the entry face of said projection objective lens.

9. Optical read-out system as claimed in claim 8, wherein said anamorphotic optical transmission means comprise a divergent cylindrical lens and a convergent cylindrical lens, having a common focal line disposed normally in relation to the longitudinal axis of said track.

* * * * *